Jan. 11, 1966 W. D. NOVAK 3,228,130
CARD SELECTING APPARATUS
Filed Dec. 12, 1961 13 Sheets-Sheet 1

INVENTOR.
WARREN D. NOVAK
BY
ATTORNEY

Jan. 11, 1966   W. D. NOVAK   3,228,130
CARD SELECTING APPARATUS

Filed Dec. 12, 1961   13 Sheets-Sheet 3

INVENTOR.
WARREN D. NOVAK
BY
ATTORNEY

Jan. 11, 1966     W. D. NOVAK     3,228,130

CARD SELECTING APPARATUS

Filed Dec. 12, 1961     13 Sheets-Sheet 5

INVENTOR.
WARREN D. NOVAK

BY

ATTORNEY

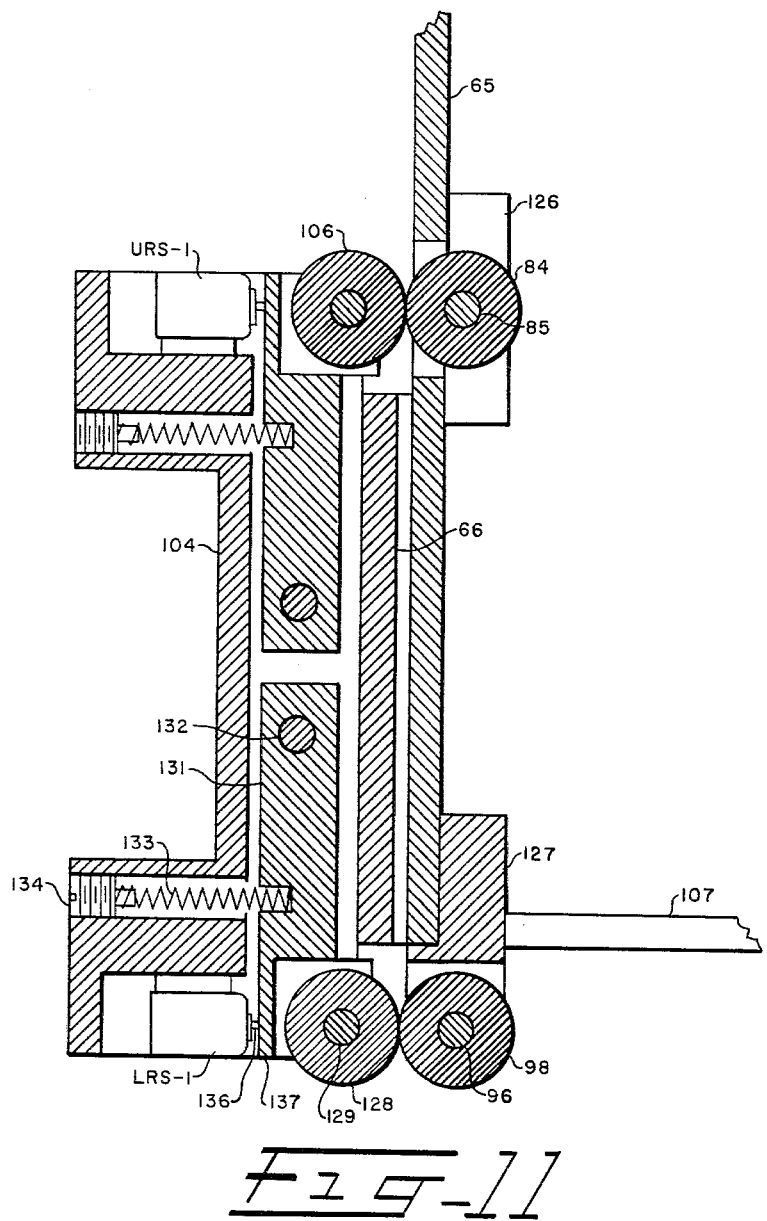

Jan. 11, 1966     W. D. NOVAK     3,228,130

CARD SELECTING APPARATUS

Filed Dec. 12, 1961         13 Sheets-Sheet 7

*INVENTOR.*
WARREN D. NOVAK

BY

ATTORNEY

Jan. 11, 1966   W. D. NOVAK   3,228,130
CARD SELECTING APPARATUS
Filed Dec. 12, 1961   13 Sheets-Sheet 10

INVENTOR.
WARREN D. NOVAK
BY
ATTORNEY

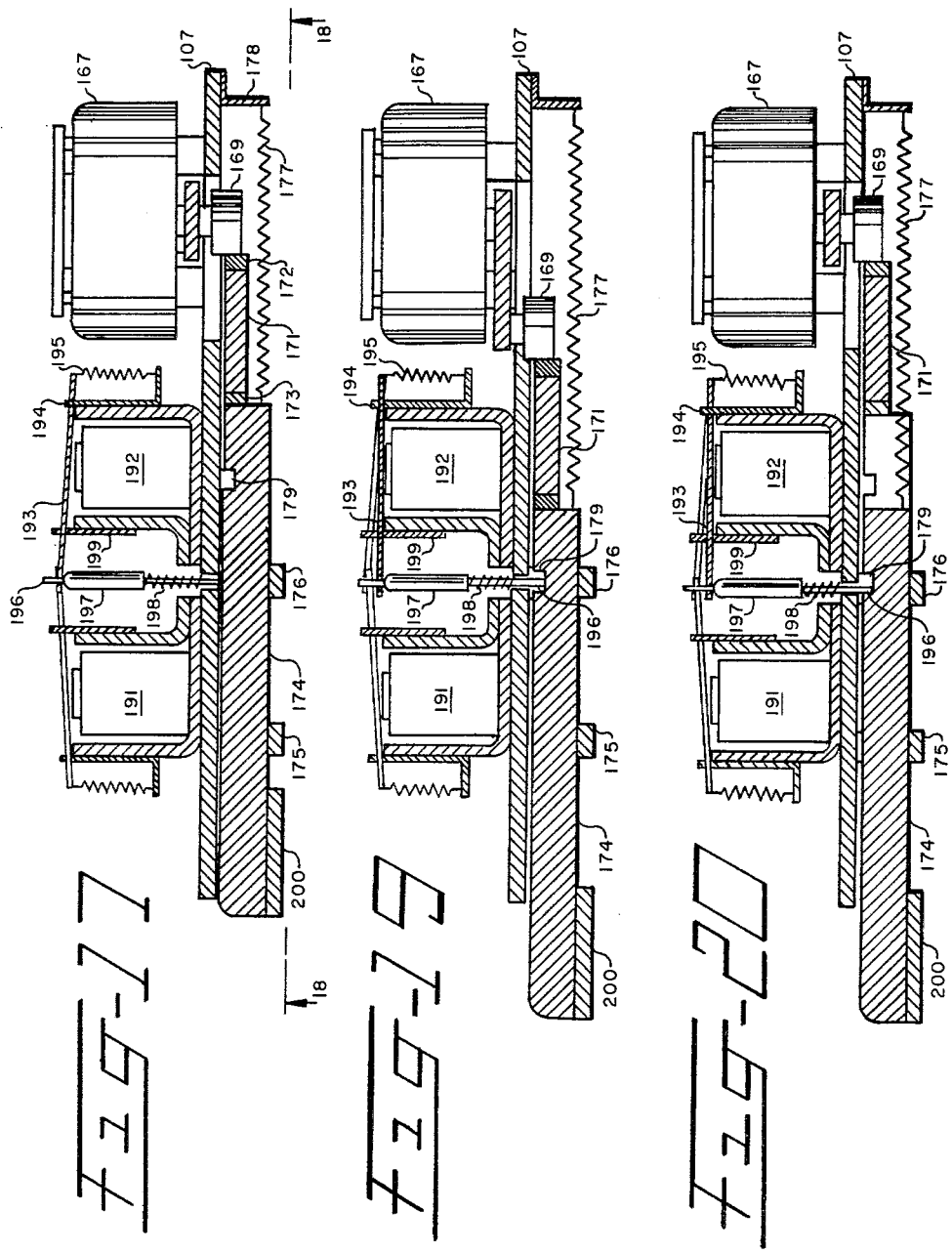

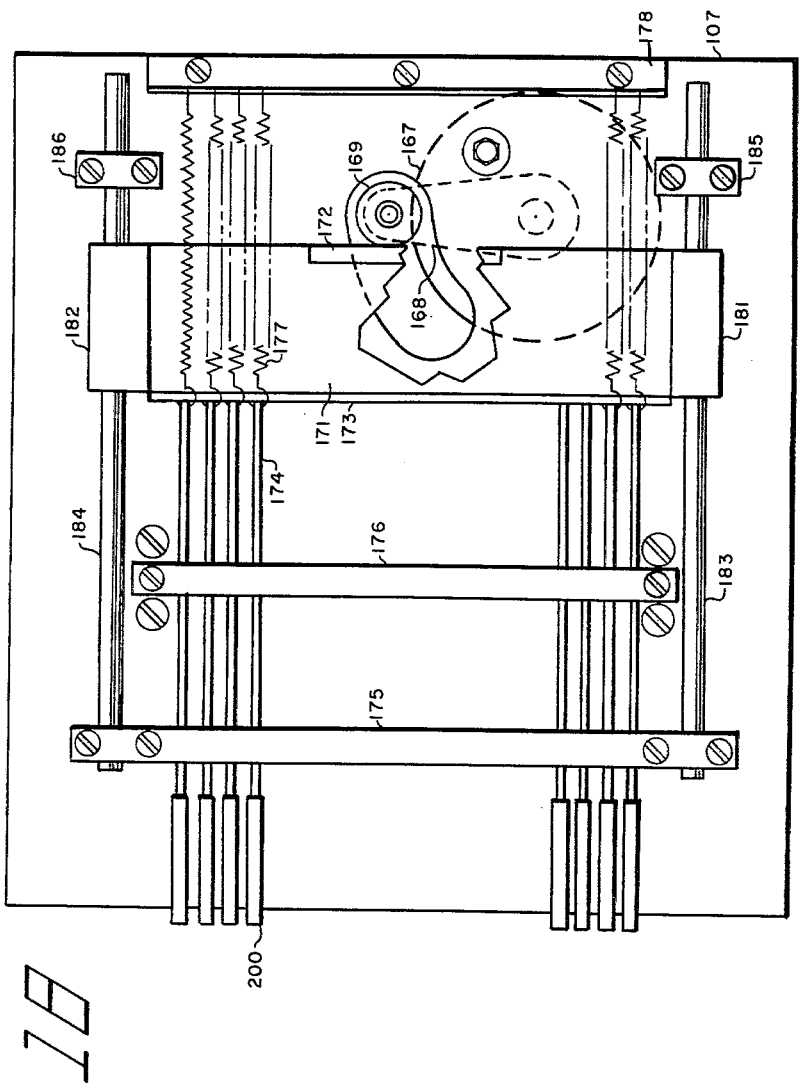

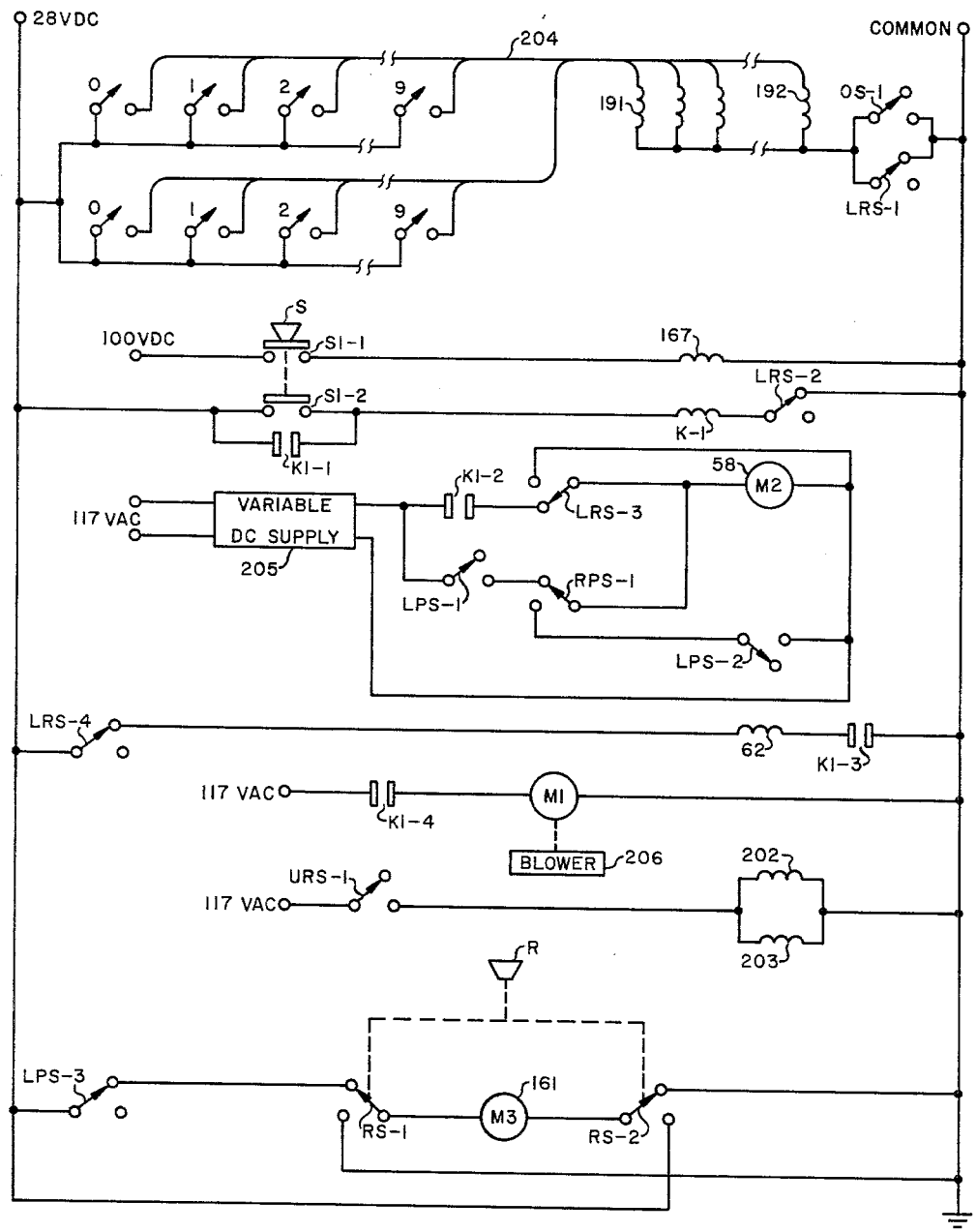

United States Patent Office 3,228,130
Patented Jan. 11, 1966

3,228,130
CARD SELECTING APPARATUS
Warren D. Novak, Chappaqua, N.Y., assignor, by mesne assignments, to The Mosler Safe Company, New York, N.Y., a corporation of New York
Filed Dec. 12, 1961, Ser. No. 158,811
26 Claims. (Cl. 40—37)

This invention relates generally to card sorting or selecting apparatus and particularly to such apparatus by which a single predetermined card in a pack of cards is located and identified as by moving it relative to the remainder of the pack.

A number of card selecting systems have been used in the past. One arrangement employs cards made with a series of holes along one edge. Individual cards are classified by punching out the material adjacent to certain holes to form notches according to a desired code. One or more rods or needles are passed through the holes or notches in the entire pack thereby holding those cards having holes but permitting those cards having notches to move relative to the rods. Separation is made by lifting the needles or by dropping the bottom of the container thereby, in each case, utilizing the force of gravity to perform the actual separation. In some machines a stream of air is directed downward to riffle the cards and prevent notched cards from sticking to adjacent unnotched cards. This arrangement is, at its best, quite cumbersome in operation.

Another arrangement known in the past employs coded notches along the bottom edges of the cards. A series of bars is positioned beneath the pack, selected ones of which are mechanically raised thereby raising those cards which do not have notches in corresponding positions. Additional apparatus is usually required to prevent adjacent cards from sticking together, which would cause unwanted cards to be raised. This arrangement causes considerable mechanical wear on the cards due not only to the contact between bars and cards but also due to adjacent cards sliding over each other. Such wear is particularly objectionable where transparencies are mounted in apertures in the cards.

It is a general object of the present invention to provide apparatus which is free of the objectionable characteristics of past apparatus for quickly and easily selecting one or more desired cards from a file of cards.

Another object is to provide card selecting apparatus which in use subjects the cards to a minimum amount of wear.

Another object is to provide apparatus by which any predetermined card in a file may be moved automatically to a position at which it is physically differentiated from the remainder of the cards in the file for manual or mechanical inspection or removal.

Another object is to provide apparatus by which any predetermined card in a file may be selected and abstracted.

Another object is to provide apparatus by which any predetermined card in a file may be selected, withdrawn from the file, held in viewing position, and returned to the file.

Briefly stated, this invention is predicated upon the discovery and determination that a velocity stream of air directed or exerted against the bottom edges of cards which are arranged in the form of a pack is effective to lift from the pack the card or cards therein which are not individually restrained or retained against movement. Although file cards are generally quite thin and therefore present only very small individual flat plate areas at their edge surfaces, peculiarly, when air at only low pressure is exerted against the pack or cards it dislodges from the pack the card which is free to respond to its effect; such card is ejected from the opposite or delivery edge of the pack sufficiently for it to be physically differentiated from the rest and to be selectively withdrawn either manually or by any suitable means. Apparently the ejection is brought about not only by pressure on the bottom or edge opposite the delivery edge but also by the relative drag of the air upon the surface of the cards as it penetrates the pack and moves between the cards, thereby carrying with it the card or cards of the pack which are unrestrained. Ejection of a card from the pack by this means is very rapid; a selected card literally "pops out" of the pack as soon as the pack is subjected to the air pressure.

For purposes of reference, the delivery edge of the cards or pack has been used to refer to the edge opposite that against which the air stream impinges while contiguous edges and edge opposite the delivery edge have been used respectively to refer to the adjoining edges and the edge opposite the delivery edge.

One embodiment of the invention comprises a pack of cards stored on edge in a suitable container. The top or delivery edge of each card is uniquely notched according to a code which identifies each individual card in the pack. A plurality of bars is positioned near the top of the pack for cooperation with the notches in the cards. One or more of the bars may be selected and moved to a position just above the pack thereby holding down all of the cards except that one having notches directly beneath the selected bars. A stream of air is passed upwardly against the bottoms of the cards in the container causing the selected card to rise until the notches engage the selected bars. When the stream of air is removed the selected card is held in the raised position by the friction with adjacent cards. All of the bars may now be withdrawn so that the selected card may be removed manually or automatically.

For a clear understanding of the invention, reference may be made to the following detailed description and the accompanying drawing, in which:

FIGURES 7–23 are detailed views of another embodiment of the invention. More specifically, FIGURE 7 is a pictorial overall view of the apparatus;

FIGURE 8 is a front view of the apparatus, partly in cross section;

FIGURE 9 is a side elevation view of the apparatus;

FIGURE 10 is a cross section view, with the cards removed, taken on the plane 10—10 of FIGURE 8;

FIGURE 11 is an enlarged fragmentary cross section view, taken on the plane 11—11 of FIGURE 8;

FIGURE 12 is a plan view of the apparatus;

FIGURE 13 is a cross section view of a detail, taken on the plane 13—13 of FIGURE 12;

FIGURE 14 is a fragmentary cross section view, taken on the plane 14—14 of FIGURE 10;

FIGURE 15 is an enlarged view of a portion of the apparatus as shown in FIGURE 14;

FIGURE 16 is a cross section view taken on the plane 16—16 of FIGURE 10, but showing some parts in different positions;

FIGURE 17 is a cross section view taken on the plane 17—17 of FIGURE 12;

FIGURE 18 is a bottom view, showing the parts beneath the base 107, taken on the plane 18—18 of FIGURE 17;

FIGURES 19 and 20 are similar to FIGURE 17 but show some of the parts in different positions;

FIGURE 21 is a view showing the control panel and its push buttons;

FIGURE 22 is a schematic representation of the functions performed by the push buttons; and FIGURE 23 is a schematic diagram of the electric connections.

Figure 1:
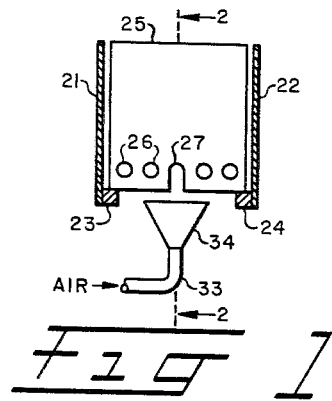
FIGURE 1 is a partially schematic cross section view of one embodiment of the invention.

Referring first to FIGURE 1, there is shown, somewhat schematically, a container comprising side plates 21 and 22 and two bottom rails 23 and 24 upon which rest a pack of cards, one card of the pack being shown at 25. According to this embodiment of the invention, all of the cards are originally formed with a series of holes 26 across the bottom. Individual cards are classified, or coded, by cutting away the material between the lower edge of the card and one or more of the holes 26 to form one or more notches such as the notch 27.

Figure 2:
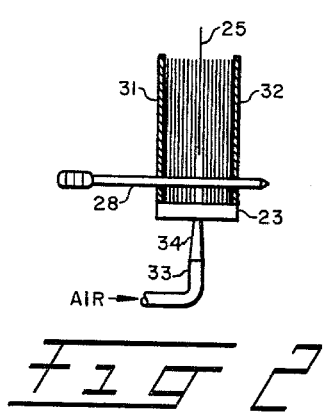
FIGURE 2 is a cross section view of the same embodiment taken on the plane 2—2 of FIGURE 1, showing a selector needle and the position of a card after selection.

When it is desired to separate one or more cards from the pack, one or more rods or needles are passed through the holes in all of the cards in the pack. One of the needles is shown at 28 in FIGURE 2, passing through end plates 31 and 32 and through all of the cards. It is obvious that the needles will retain all of the cards in the container except those cards having notches in positions corresponding to the positions of the inserted needles.

There is also provided a flexible hose 33 adapted to be connected to source, such as a blower (not shown) of gaseous fluid such as air under pressure. The end of the hose 33 is provided with a nozzle 34, broad in one dimension and narrow in the other, as shown, so as to form a fan shaped stream of air. As the nozzle 34 is passed beneath the cards, for example from left to right as viewed in FIGURE 2, a sheath of moving air envelopes the cards successively. Any card not restrained by one or more needles is raised, as indicated by the raised position of the card 25 in FIGURE 2. Since the moving air passes between the card being raised and each adjacent card, little or no abrasion occurs during the raising process. It is important to note that the stream of air alone is sufficient to raise a selected card without assistance from any mechanical bars, levers, or the like.

Figure 3:
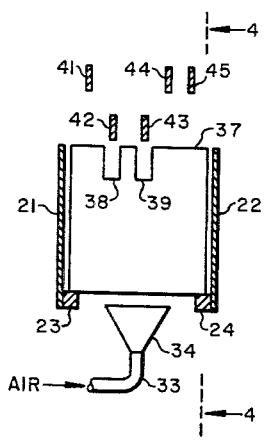
FIGURE 3 is a partially schematic cross section view of another embodiment of the invention.
Figure 4:
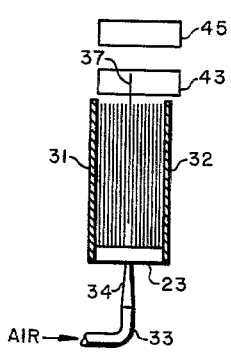
FIGURE 4 is a cross section view taken on the plane 4—4 of FIGURE 3, showing the position of a card which has been selected.
Figure 5:
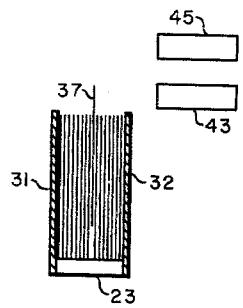
FIGURE 5 is a cross section view, similar to FIGURE 4, with the parts in another position.

The system of retention of cards by means of needles is somewhat awkward to use and also uncertain as to the height or distance to which the selected card might be projected or ejected from the pack. If the cards are loose enough in the container the selected card may even be completely ejected. FIGURES 3–5 illustrate a more convenient arrangement which avoids this possibility.

Referring now to FIGURE 3, there is shown the same container comprising side plates 21 and 22 and bottom rails 23 and 24 together with the air hose 33 and nozzle 34. Each card in the pack is formed with one or more notches on the top edge, the number and position being determined by any desired code. Illustrated is a card 37 provided with two notches 38 and 39.

Mounted adjacent to the top of the container is a series of selector bars 41–45, each of which is moveable to an active position just above the container, as illustrated by the bars 42 and 43 which lie just above the notches 38 and 39. It is obvious that each active bar will prevent upward movement of all cards except those having a notch directly beneath. In the case illustrated, only that card or those cards having notches beneath each of the bars 42 and 43 can be raised.

Card selection is accomplished as before by sweeping the air stream across the bottom of the container, for example from the left to right as viewed in FIGURE 4, wherein the card 37 is shown in its raised position. The elevation of the card 37 is, of course, limited to that position at which the bottom of the notches 38 and 39 abut the selector bars 42 and 43. After the card having appropriate notches has been raised, the air stream may be removed and the card will remain in its elevated position, held there by friction with adjacent cards, as shown in FIGURE 5.

It has been found that there is a wide range of card packing density which permits the card to be both raised by the air stream and held in its elevated position by the friction of adjacent cards. For example, using a container 1.0" wide and cards 0.007" thick, any number of cards from about eighty to one hundred or more provides a satisfactory density. If desired the entire assembly may be turned on its side so that the air stream blows the selected card horizontally in which case there is no danger of the selected card dropping back into the container after removal of the air stream and selector bars.

Figure 6:
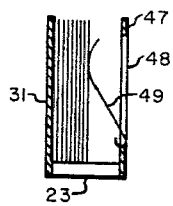
FIGURE 6 is a cross section view showing an optional feature of the invention.

FIGURE 6 illustrates a modified form of card file in which the end plate 32 has been replaced by an end plate 47 provided with an aperture 48 in which is mounted an S shaped spring 49 which holds the cards upright and urges them gently against the end plate 31. The spring 49 is selected to provide just sufficient friction so that any card raised by the air stream is held in its elevated position when the stream of air is removed. With this arrangement it is not necessary that the file be full, or nearly full, of cards. Satisfactory operation can be obtained with but a single card in the file.

The remaining figures illustrate an embodiment of the invention constructed to select automatically any one of one hundred cards in a file, to remove the selected card, to place it in a convenient position for viewing, and to replace the card in the file. This specific embodiment is designed for use with cards 3¼" by 7⅜" by approximately 0.007" thick having an aperture on the order of 1½" x 2" in which is installed a strip of microfilm containing useful information. Such cards are often called microfilm aperture cards.

Figure 7:
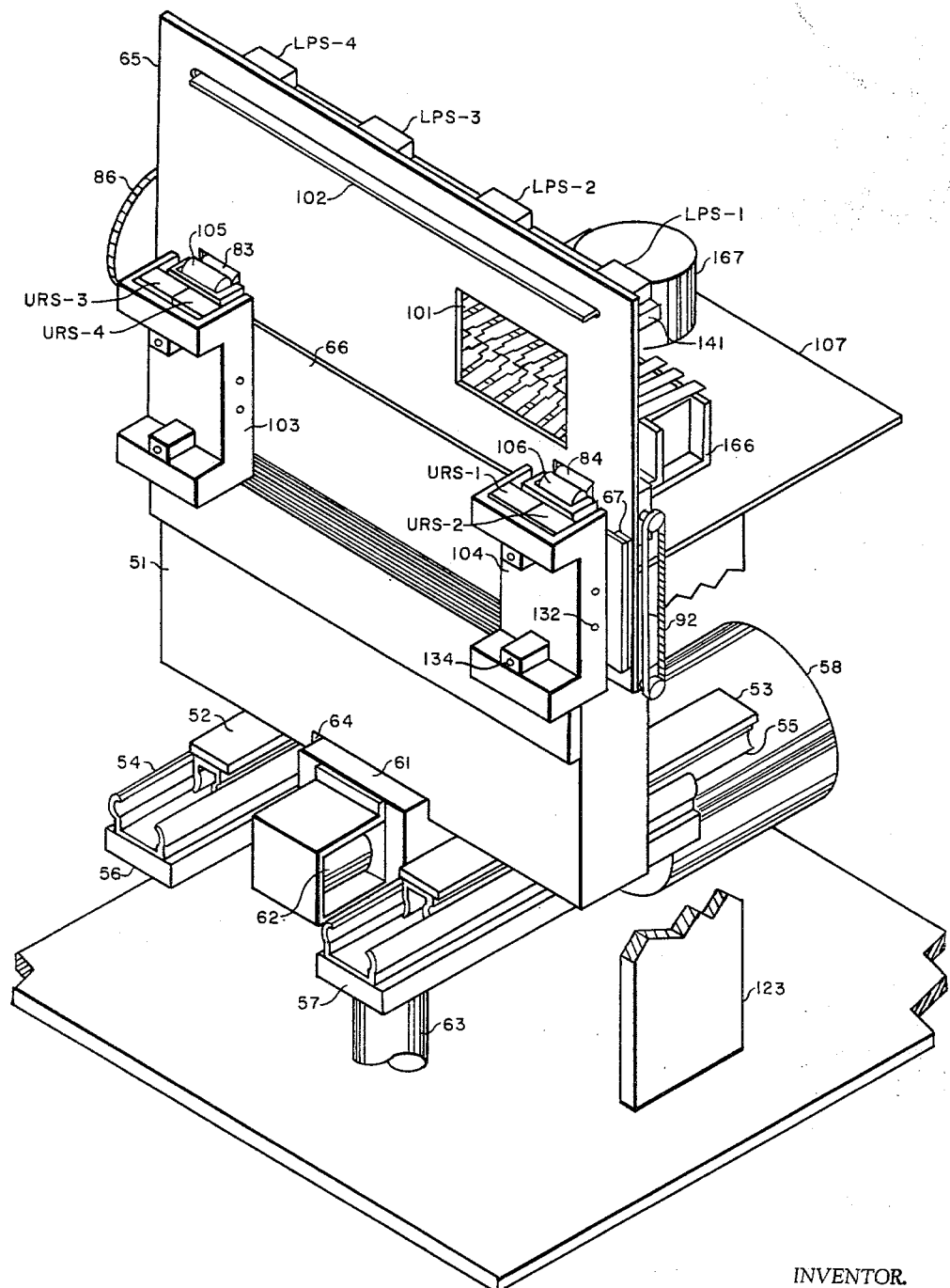

Referring now to FIGURE 7 there is shown a card file 51 of generally rectangular shape having an open top and designed to hold one hundred cards. The file 51 is mounted on two straps 52 and 53 which in turn are fastened to the upper portions of two ball bearing slides 54 and 55. The lower portions of the slides are fastened to two stationary frame members 56 and 57 with the result that the file 51 is moveable on the slides. Movement is accomplished with an electric motor 58 through a mechanism to be more fully described.

Beneath the file 51 can be seen a portion of a combined nozzle and valve 61, the details of which will be described subsequently. For the present it is sufficient to note that the nozzle includes an orifice about 1⅜" long and about 0.040" wide and that the valve is spring biased to a closed position. An electromagnet 62 is mounted on the nozzle assembly and, when energized, opens the valve. A pipe 63 is connected to a source of gaseous fluid under pressure, such as a motor driven air blower (not shown in FIGURE 7). The nozzle and valve assembly is rigidly mounted and does not move. The file 51 is relieved on the bottom, as shown by reference character 64, in the region of the nozzle 61 so that the top of the nozzle lies closely adjacent to the bottom of the cards.

A plate 65 is mounted in a vertical plane and serves as a platen or guide to hold a card in viewing position. A wide strap 66 is mounted parallel to and spaced in front of the plate 65 by two small spacers or shims, one of which can be seen at 67, and the other of which is on the opposite side, hidden from view in FIGURE 7. The plate 65 and the strap 66 are positioned relative to the nozzle assembly 61 so that the orifice of the nozzle (not visible in FIGURE 7) is directly beneath and aligned with the space between the plate 65 and the strap 66. Thus, when a card is raised, it passes between the plate 65 and the strap 66.

Figure 8:
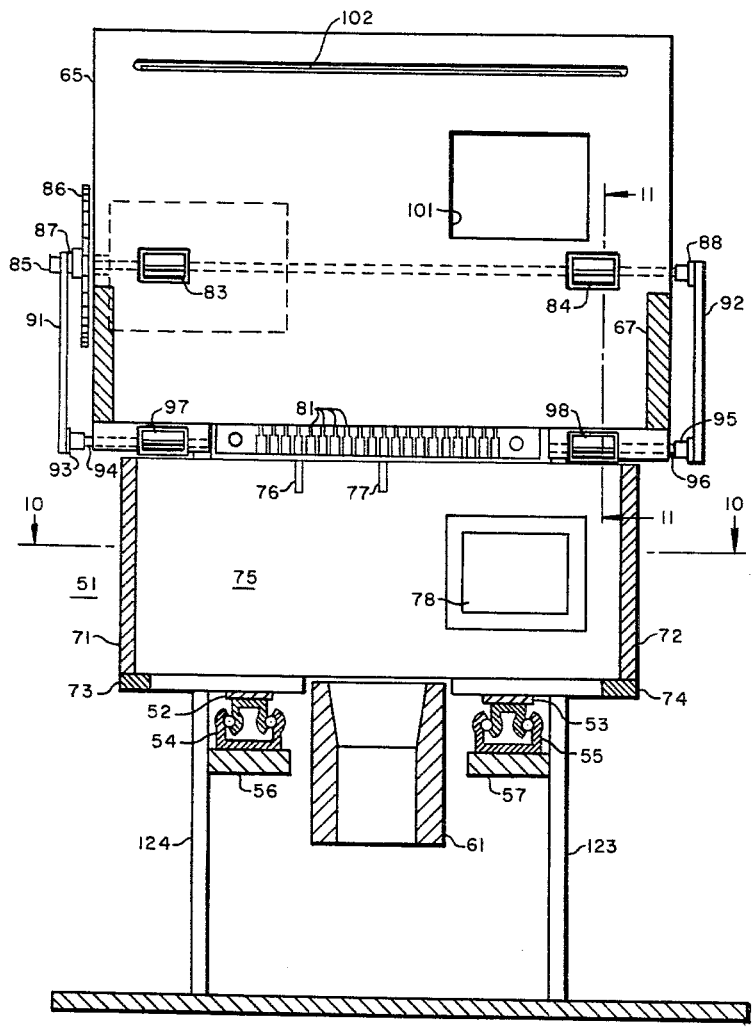

Turning now to FIGURE 8, the card file 51 is seen to comprise, in part, two end plates 71 and 72 fastened to bottom rails 73 and 74 which support the bottom edges of cards on opposite ends leaving the bottom of the file open except for the rails. Supported by the rails 73 and 74 is a card 75 having two notches 76 and 77 on the top and a strip of film 78 installed in an aperture. The notches may, for example, each be ³⁄₁₆″ wide and ½″ deep and are positioned in accordance with any desired code which will uniquely identify each of one hundred cards. For example, twenty notch spaces may be reserved on each card, ten of these representing units and ten representing tens. Thus, each of the one hundred cards may be identified by not more than two notches in accordance with a simple decimal code.

Just above the card 75 can be seen the ends of twenty selector bars 81 each positioned above one of the spaces in the card which has been reserved for notches. These bars are each movable in a direction generally perpendicular to the paper as viewed in FIGURE 8, to either a retracted position or to an active or extended position overlying some or all of the cards in the file, by apparatus to be described subsequently. Each extended bar prevents upward movement of all cards directly beneath except those having notches in registry.

Two small rollers 83 and 84 are fastened to a shaft 85 which in turn is mounted on the rearward side of the plate 65. Two small apertures in the plate 65 permit a portion of each roller to extend beyond the front surface of the plate 65. An electric motor (not visible in FIGURE 8) drives a gear 86 fastened to the shaft 85 so as to rotate the rollers 83 and 84. Two pulleys, 87 and 88, fastened to opposite ends of the shaft 85, drive toothed timing belts 91 and 92 respectively, the former driving a pulley 93 on a shaft 94 beneath the plate 65 and the latter driving a pulley 95 on a shaft 96 also beneath the plate 65. Rollers 97 and 98 are mounted on the shafts 94 and 96 respectively and are vertically aligned with the rollers 83 and 84.

The plate 65 is formed with an aperture 101 above the strip of film 78. Near the top of the plate 65 is a bar 102, pivotally mounted, as will be more fully explained, which serves to position a card as it is raised by the rollers so that the film 78 and the aperture 101 are in registry.

Returning to FIGURE 7, there can be seen the above mentioned aperture 101 and bar 102 and also two generally U shaped brackets 103 and 104 fastened to the strip 66. Two rollers 105 and 106 are mounted on the brackets 103 and 104 respectively and are spring biased toward and rotated by the rollers 83 and 84 respectively. Two additional rollers, not visible in FIGURE 7, are similarly mounted on the bottom of the brackets 103 and 104. The details of the mounting of these rollers will be described subsequently.

Also shown in FIGURE 7 is a horizontally mounted shelf or base 107 on which is mounted apparatus for actuating the selector bars 81 (not visible in FIGURE 7) as will be more fully explained.

Figure 9:
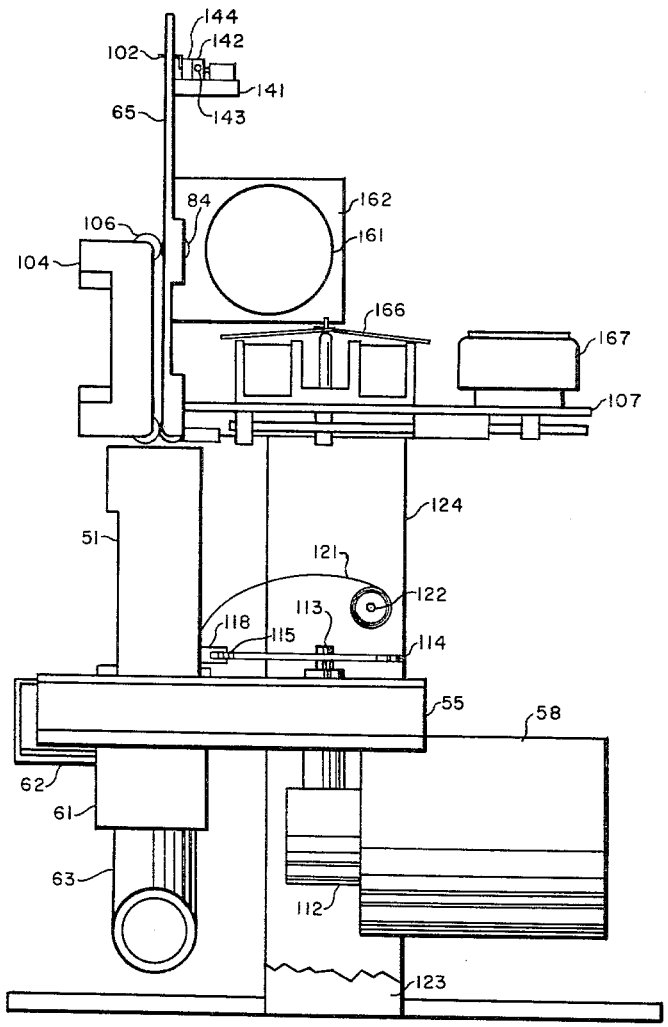

Referring now to FIGURE 9, there is shown the electric motor 58 equipped with a right angle drive unit 112 which rotates a shaft 113, to which is fastened a generally heart shaped cam 114. This cam cooperates with a roller 115 fastened to the file 51.

Figure 10:
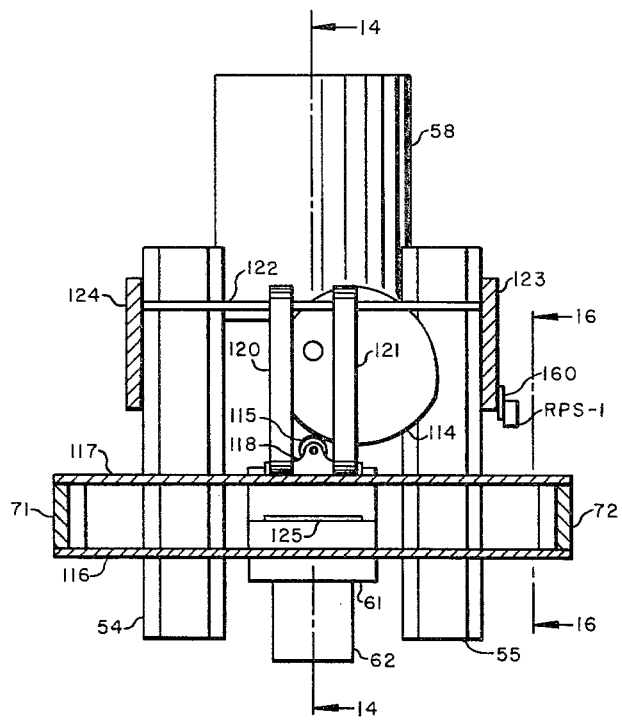

As best shown in FIGURE 10, the file 51 comprises not only the previously mentioned end plates 71 and 72 but also front and back plates 116 and 117 respectively. The roller 115 is mounted on a suitable bracket 118 which in turn is fastened to the back plate 117. Two springs 120 and 121 urge the file 51 backward toward the cam 114. One end of each spring is fastened to the back plate 117 while the other end of each is coiled around a rod 122 which in turn is supported by frame members 123 and 124. See also FIGURE 9. The shape of the cam 114 is chosen so that rotation of the cam causes the file to move forward and backward cyclically at a uniform rate.

Also shown in FIGURE 10 is the elongated orifice 125 constituting the end of the nozzle 61.

Referring now to FIGURE 11, there is shown the roller 84 mounted on the shaft 85 which in turn is carried by a bracket 126 fastened to the plate 65. The shaft 96, carrying the roller 98, is mounted on a bracket 127 fastened to the bottom of the plate 65. The roller 98 engages a roller 128 fastened to a shaft 129 which in turn is fastened to the lower end of a depending bracket 131. The bracket 131 is pivoted about a shaft 132, opposite ends of which are fastened to the U shaped bracket 104. One end of a compression spring 133 bears against the bracket 131 while the other end bears against a screw 134 in the bracket 104 thereby urging the roller 128 against the roller 98. A short throw micrometer switch LRS–1 (lower roller switch 1) is mounted in a recess in the bracket 104 with its actuator 136 engaging a portion 137 of the bracket 131. When a card is drawn between the rollers 98 and 128, the bracket 131 swings to the left about the shaft 132 thereby actuating the switch LRS–1.

The roller 106 is similarly mounted at the top of the bracket 104 and when a card is drawn between rollers 84 and 106, a micrometer switch URS–1 (upper roller switch 1) is actuated.

As best shown in FIGURE 7, there is an additional switch, URS–2 mounted at the top of the bracket 104 which is actuated simultaneously with the actuation of switch URS–1. The bottom of the bracket 104 is similar to the top and likewise carries two switches, the previously mentioned switch LRS–1 (FIGURE 11) and also the switch LRS–2.

The bracket 103 is identical to the bracket 104 and likewise carries two switches, URS–3 and URS–4, at the top, actuated by the presence of a card between the rollers 83 and 105 (FIGURE 7). Similarly, the bracket 103 carries a roller 138 and two switches, LRS–3 and LRS–4 (not shown in FIGURE 7), at the bottom. Thus, when a card enters the lower drive rollers four switches, LRS–1, LRS–2, LRS–3 and LRS–4 are actuated and when a card enters the upper drive rollers four more switches, URS–1, URS–2, URS–3, and URS–4 are actuated. The switches are used for control purposes, as will be more fully explained.

The distance between the two pair of lower rollers (one pair, 98 and 128, being visible in FIGURE 11) and the two pair of upper rollers (84 and 106 in FIGURE 11) should be made less than the width of the card so that as a card is drawn upward it will be engaged by the rollers 84 and 106 before being disengaged from the rollers 98 and 128. The specific embodiment being described is designed for use with cards 3¼″ wide and a distance between rollers of about 2¾″ has been found satisfactory.

Figure 12:
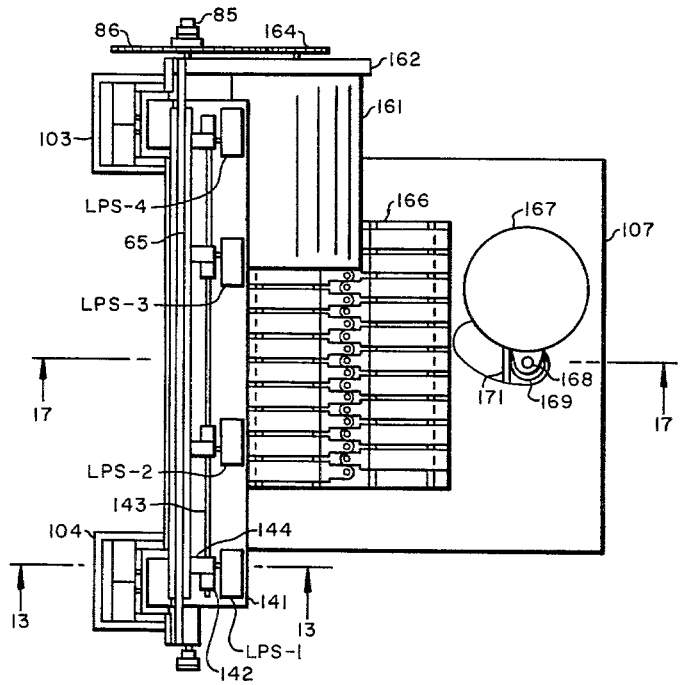

As shown in FIGURES 9 and 12, an elongated shelf 141 having a horizontal surface is fastened to the back side of the plate 65 near the top thereof. Four small fixed blocks, of which block 142 is typical, are mounted on the top surface of the shelf 141 as shown. A shaft 143 extending substantially the entire length of the shelf 141 is mounted in apertures in each of these fixed blocks. Four small rotatable blocks, of which block 144 is typical, are mounted to be rotatable about the shaft 143, one adjacent to each of the fixed blocks.

Figure 13:
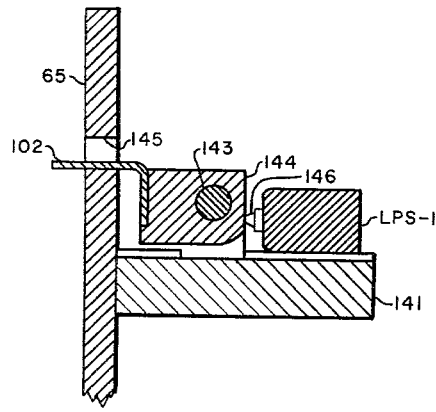

As best shown in FIGURE 13, the previously mentioned bar 102 (FIGURES 7, 8 and 9) has an L shaped cross section. One arm extends through an aperture 145 in the plate 65 while the other arm is fastened to the rotatable block 144 and also to each of the other rotatable blocks. A micrometer switch LPS–1 (limit position switch one) is mounted on the shelf 141 with its actuator 146 touching the block 144. The shaft 143 passes through the rotatable block 144 to one side, that is, to the right as viewed in FIGURE 13, so that the force of gravity urges the block 144 and the bar 102 counterclockwise to the position shown. The actuator 146 touches the block 144 below the pivot point and when the parts are in the position shown, the actuator 146 is depressed into the switch LPS–1. It is apparent that, when the bar 102 is raised, as by a card, the block 144 will pivot allowing the actuator 146 to extend, thereby operating the switch LPS–1.

Three additional switches, LPS–2, LPS–3 and LPS–4 are similarly mounted and are shown in FIGURE 12. These switches are used for control purposes as will be more fully described.

Figure 14:
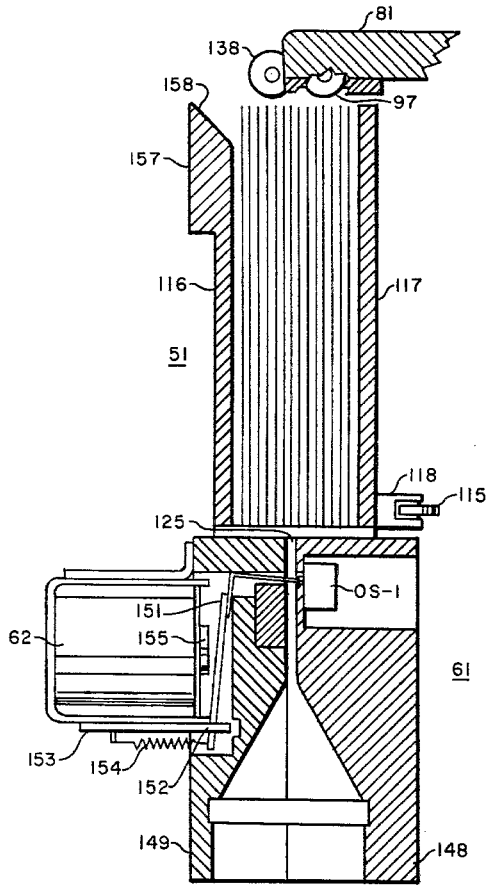

Referring now to FIGURE 14, the nozzle and valve indicated generally by the reference character 61 comprises two metal blocks 148 and 149 each formed with a semi-cylindrical opening at the bottom so that when fastened together the opening fits the previously mentioned pipe 63. Preferably the openings converge to form the orifice 125 so that when air is supplied (through the pipe 63) there is formed a fan shaped stream of air, that is, a stream the cross section of which is broad in one dimension and narrow in the other dimension.

The electromagnet 62 has an armature 151 pivoted at 152 in a frame member 153. A spring 154 urges the armature 151 out of engagement with the core 155.

Figure 15:
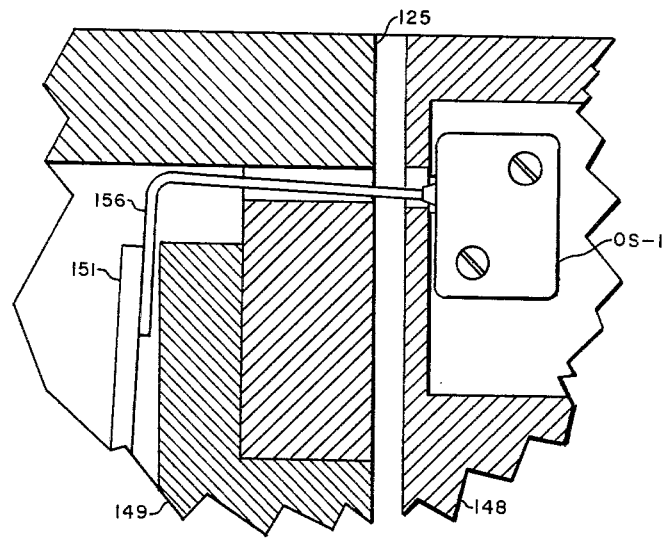

As best shown in FIGURE 15, the armature 151 has attached thereto an L shaped vane 156 which fits in a recess in the block 149 and extends through the orifice 125 and through a recess in the block 148 where it engages the actuator of a switch OS–1 (orifice switch 1). The recesses are shown enlarged for clarity whereas actually they are only large enough for mechanical clearance so that with the vane 156 in the position shown, the orifice 125 is substantially blocked and only an insignificant amount of air can emerge. When the electromagnet 62 is energized, the armature 151 is attracted to the core 155, the vane 156 is withdrawn from the orifice, air can flow, and the actuator of the switch OS–1 is released.

Above the orifice 125 in FIGURE 14 are shown the front and back plates 116 and 117 of the card file and above these are the rollers 138 and 97. It will be recalled that the rollers and orifice are stationary while the cards are movable (to the right and left as viewed in FIGURE 14). Since, as shown, the engaging surfaces of the rollers are directly above the orifice 125, any card raised by the flow of air will be engaged by the rollers.

Also shown in FIGURE 14 is one of the selector bars 81 in its active, or extended, position. In this position the end of the bar 81 extends beyond the plane of action, that is, the plane which intersects the engaging surfaces of all of the rollers and the center line of the orifice 125.

Figure 16:
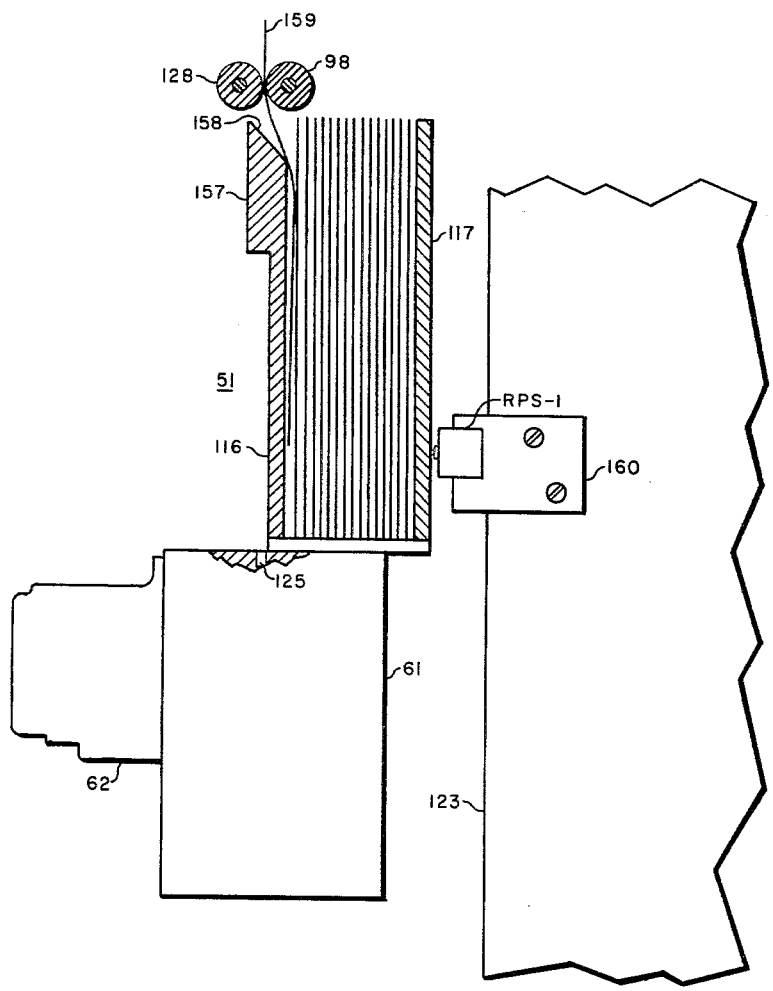

Referring now to FIGURE 16, there is shown the card file 51 in its reference position, which is the position farthest to the right, as viewed in FIGURE 16. This is the position occupied by the file 51 when a previously withdrawn card is to be reinserted into the file or pack. The front plate 116 is made with an enlarged or thickened portion 157 at the top. The top surface has an inclined edge 158 which makes an angle of approximately forty-five degrees with the horizontal. The corners are rounded. In the reference position of the file 51, as shown, the inclined edge lies directly beneath the intersection of the rollers 98 and 128 (and the other rollers as well). A card is reinserted by reversing the direction of rotation of all of the rollers whereupon the lower edge of the card engages the inclined edge 158, slides along the edge until it engages the first card and then slides into the front of the file. In the process the card being reinserted is curved slightly, as shown by the card 159, which is about two-thirds of the way into the file. As the upper edge of the card 159 leaves the intersection of the rollers, the curvature of the card urges its upper edge against the lower surface of the roller 98 which therefore continues to drive the card downward until the top edge of the card lies beneath the bottom of the roller 98. Momentum may even carry the card farther downward, but this is not important it only being necessary for the card to clear the bottom of the rollers since the selector bars are at approximately this level or slightly above. In any event, the next time the cards are riffled by the air stream, the cards drops completely into the file.

It is to be noted that the process of reinserting a card which has been completely withdrawn from the pack is facilitated by providing a reference position for the file so that each such card is returned to the same position in the file, that is to the front of the pack. The fact that this process may change the relative positions of the cards within the file is immaterial because each card is coded and may be found and removed regardless of its location in the file.

The reference position shown is established with the aid of a micrometer switch RPS–1 (reference position switch 1) which is mounted on a small plate or bracket 160 which in turn is mounted on the frame member 123. The electric circuit by which the file is brought to the reference position will be described subsequently.

Returning to FIGURE 12, an electric motor 161 is mounted on a bracket 162 which in turn is fastened to the plate 65 (see also FIGURE 9). The motor 161 drives a pinion 164 which meshes with the previously mentioned gear 86 to rotate the shaft 85.

The base 107 supports an assembly 166 including twenty electromagnets the armatures of which actuate twenty pins so as to activate certain selector bars, as will be more fully explained. Also mounted on the base 107 is a rotary solenoid 167 including an arm 168 with a roller 169 on the end. A bar 171, mounted beneath the base 107, is displaced to the left as viewed in FIGURE 12, when the solenoid 167 is energized.

Referring now to FIGURE 17, there is shown the rotary solenoid 167 with the roller 169 bearing against the bar 171. This bar has a strip 172 of hardened steel along one edge in the region engaged by the roller 169 and a strip 173 of soft, non-resilient material such as felt on the opposite edge.

There is shown a selector bar 174 which is one of the twenty such bars 81 previously mentioned in connection with FIGURE 8. The bar 174 is typical and is supported just below the base 107 by grooves in two guide bars 175 and 176 so as to be slideable from right to left, as viewed in FIGURE 17. A tension spring 177 has one end fastened to the selector bar 174 and the other end fastened to a bracket 178 which in turn is fastened to the base 107 so as to urge the selector bar 174 to the right, as viewed in FIGURE 17. A notch 179 is formed in the top of the bar 176.

As shown in FIGURE 18, the bar 171 has two enlarged portions 181 and 182 on opposite ends fastened to rods 183 and 184 respectively. The rods 183 and 184 pass with sliding fits through apertures in brackets 185 and 186 respectively which in turn are fastened to the base 107. The rods 183 and 184 also pass with sliding fits through apertures in either end of the guide bar 175. As a result, the bar 171 and the rods 183 and 184 are slideable back and forth as a unit.

Also shown in FIGURE 18 are the two guide bars 175 and 176 fastened to the base 107 and each provided with twenty grooves on the edge adjacent the base 107 (not visible in FIGURE 18) for holding the selector bars in position while permitting each to slide back and forth from left to right. Although but eight selector bars are shown, it will be understood that there are twenty, the remaining twelve having been omitted from the drawing to show the other parts more clearly.

Each of the selector bars, such as the bar 174, abuts the edge 173 of the sliding bar 171 and each is urged to the right by its individual spring, such as the spring 177. It is apparent that the selector bars and their springs collectively urge the sliding bar 171 to the right toward the position shown in FIGURES 17 and 18. It is also apparent that energization of the rotary solenoid 167 will cause the arm 168 and the roller 169 to slide the bar 171 to the left thereby moving all of the selector bars to the left.

Returning to FIGURE 17, there are shown electromagnets 191 and 192 which are but two of the twenty electromagnets contained in the assembly 166 previously mentioned in connection with FIGURE 12. The electromagnet 192 and its associated apparatus is typical and includes an armature 193 pivoted on a bracket 194. A spring 195 at one end of the armature 193 urges the armature 193 out of engagement with electromagnet 192. A vertical pin 196 passes through an aperture in the opposite end of the armature 193 and through a small aperture in the base 107, normally occupying the position shown with its lower end approximately flush with or just above the lower surface of the base 107. A shoulder 197 integral with the pin 196 is positioned with its upper end just below the armature 193. A spring 198 acts between the lower end of the shoulder and the base 107 and aids the spring 195 in urging the pin 196 and the armature 193 upward to the normal position shown at which the armature 193 engages the upper edge of an aperture in a brass plate 199. The pin 196, the electromagnet 192 and the above described associated apparatus, together with the notch 179, comprise a latch for holding the selector bar 174 in its active position.

Referring now to FIGURE 19, the parts are shown in the positions occupied with the selector electromagnet 192 and the rotary solenoid 167 both energized. All of the selector bars, such as bar 174, have been shifted to the left. The pin 196 has entered the notch 179 thereby latching the bar 174 in its active position.

FIGURE 20 shows the parts after the rotary solenoid 167 has been de-energized but with the selector electromagnet 192 still energized. The bar 174 is held to the left by the pin 196 but the remaining bars have been moved back to the right by their respective springs.

As shown in FIGURES 17 and 18, each of the selector bars, such as the bar 174, is provided with a shoe 200 fastened to its end. As shown in FIGURE 17, the shoe extends downward from the lower edge of the bar 174 and as shown in FIGURE 18 the shoe is slightly wider than the bar 174. The width is made a bit less than the width of the notches in the card. For example, with notches 3/16" wide, a shoe width of approximately 1/8" has been found satisfactory.

Figure 21:
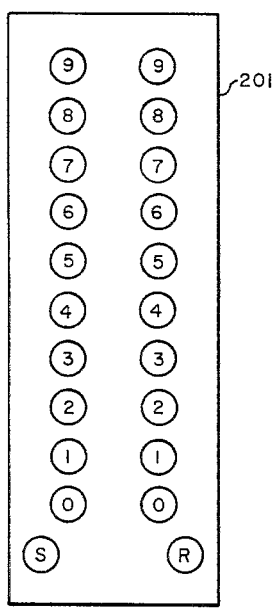

Referring now to FIGURE 21, there is shown a control panel 201 provided with two columns of ten push buttons each, marked zero to nine inclusive, one column representing units and one column representing tens. This assembly of buttons is of the known type in which any button when manually depressed is mechanically latched in its depressed position. Similarly, depression of any button raises any other button in the same column which may have been previously depressed.

Figure 22:
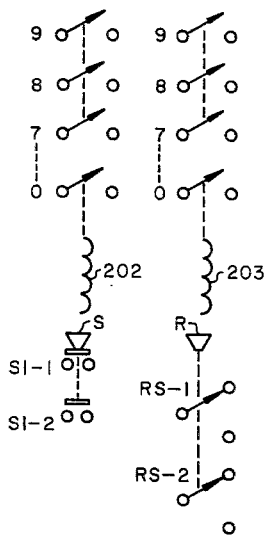

Each button when depressed closes a single pole single throw switch, as indicated in FIGURE 22. Additionally, each column is provided with a solenoid, designated 202 and 203 in FIGURE 22, which is mechanically interlocked with all of the buttons and switches in its associated column so that when energized, any previously depressed button is raised and no buttons may be latched in the depressed position. The mechanical interconnection by which these functions are achieved have not been shown in detail since they are conventional and well known in the art. Each of the above mentioned switches is connected, as will be more fully described, to one of the twenty electromagnets in the assembly 166 (FIGURE 12) so as to control one of the selector bars 81 (FIGURE 8).

The control panel 201 is also provided with buttons "S" (search) and "R" (return) near the bottom. Each is spring biased to its upward position and remains actuated only while held down by the operator. As shown in FIGURE 22, the "S" button actuates two sets of normally open contacts, S1-1 and S1-2. The "R" button actuates two single pole double throw switches RS-1 (return switch 1) and RS-2. The electrical connections to these switches will be described subsequently.

*Operation*

The operation of the apparatus will first be described without reference to the electric connections which enable the various functions to be performed. Subsequently, the electric connections will be discussed in connection with the circuit diagram.

It will be assumed that the electric power has been turned on and the apparatus is ready for card selection. At this time all of the rollers are rotating in such a direction as to raise a card engaged by them; all the selector bars 81 are in their inactive positions; and the valve in the orifice assembly 61 is closed so that no air flows. Operation is controlled by the panel 201 (FIGURE 21). For example, assume that card number 54 is to be selected. The "five" button in the tens column and the "four" button in the units column are depressed, thereby closing the corresponding switches and energizing the selected two of the twenty electromagnets in the assembly 166 (FIGURES 7, 9 and 12). It will be recalled that each electromagnet, when energized, urges its associated pin (such as the pin 196, FIGURE 17) downward but, as is apparent from FIGURE 17, none of the pins can move far at this time since they bear on the tops of their respective selector bars.

Next, the "search" button is depressed momentarily, thereby starting the operation. The rotary solenoid 167 is energized, thereby shifting all of the selector bars to their active positions. The two pins corresponding to the "five" and the "four" buttons are urged into the slots in their respective selector bars thereby latching these bars in their active positions. The solenoid 167 becomes de-energized, thereby enabling the springs, such as the spring 177, to return the remaining eighteen bars to their inactive positions. At substantially the same time, the electromagnet 62 (FIGURES 7 and 14) is energized thereby retracting the vane 156 (FIGURE 15) and allowing air to flow upward through the orifice 125. Also at the same time, the motor 58 (FIGURES 7, 9 and 10) is energized thereby rotating the cam 114 and driving the card file 51 back and forth between the orifice 125 beneath and the rollers and selector bars above. The air stream from the orifice 125 now acts on the bottom of and envelopes each card successively. The two active selector bars substantially prevent upward movement of all cards except that one having notches in registry and as the desired card passes above the orifice 125 it is raised or popped up by the air stream. Upward movement would be limited by the engagement of the bottom of the notches in the card with the bottom of the active selector bars but before this position is reached the edge of the card is engaged by the lower drive rollers (97, 138, 98, 128, FIGURES 8, 11, and 14).

The lower drive rollers start raising the card but almost immediately the lower roller switches, such as the switch LRS-1 of FIGURE 11, are actuated thereby causing three operations to occur substantially simultaneously. First the motor 58 is stopped, thereby holding the card file 51 in its then attained position. Second, the electromagnet 62 is de-energized thereby allowing the spring 154 (FIGURE 14) to force the vane 156 (FIGURE 15) across the orifice thereby terminating the flow of air. Third, the previously energized selector electromagnets are de-energized thereby retracting the pins (such as the pin 196, FIGURE 20) and allowing the springs, such as the spring 177, to return the two selector bars to their inactive positions out of the path of upward movement of the selected card.

The card is now drawn upward by the lower drive rollers. Before leaving these rollers it is engaged by the upper drive rollers (83, 105, 84, 106, FIGURE 7) thereby actuating the upper roller switches URS–1, URS–2, URS–3, and URS–4. One of these energizes the two solenoids 202 and 203 (FIGURE 22) in the control panel thereby returning the previously depressed buttons "five" and "four" to the upward position and preventing any buttons from being latched in the down position.

The card continues its upward movement, the upper edge finally engaging and raising the bar 102 (FIGURES 7, 8 and 9). As best shown in FIGURE 13, raising of the bar 102 rotates the block 144 thereby actuating the switch LPS–1 (and switches LPS–2, LPS–3 and LPS–4, FIGURE 12, as well). Actuation of these switches has two effects. First, the drive roll motor 161 (FIGURES 9 and 12) is stopped, thereby stopping all of the drive rollers and holding the card in position. Second, the scan motor 58 (FIGURES 7, 9 and 10) is re-energized, driving the file 51 to its reference position where is actuates the switch RPS–1 (FIGURES 10 and 16) which then stops the motor 58, holding the file in its reference position.

The card is held on the plate 65 (FIGURES 7 and 8) by the now stationary upper drive rollers 83, 105, 84, 106 with the upper edge of the card against the bar 102 and with the film strip 78 in registry with the aperture 101. The card may be viewed directly in this position or an image may be projected optically directly to a reflective viewing screen or, through closed circuit television equipment, to one or more monitors.

When it is desired to return the card to the file, the "return" button R (FIGURES 21 and 22) is depressed. This action causes the drive roll motor 161 (FIGURES 9 and 12) and all of the rollers to run in the reverse direction, thereby driving the card against the inclined edge 158 (FIGURE 16) and sliding it into the front of the file 51. As the card is being returned, the solenoids 202 and 203 (FIGURE 22) are de-energized, thereby unlocking the latch mechanism and enabling a new card selection to be made by depressing any desired buttons.

*Circuit diagram*

Referring now to FIGURE 23, there is shown schematically the electric circuit by which the previously described functions are performed. Several different power supplies are shown to suit the requirements of the various elements. While it would be possible, by suitable selection of components, to perform all of the functions with a single supply, the circuit actually used will be described for illustrative purposes.

At the top of FIGURE 23 are shown a few of the selector switches associated with the control panel 201 which are arranged in two columns of ten each. It will be understood that although only some of the switches are shown, all are similarly connected. One terminal of all of the switches are connected together to the 28 volt supply while conductors from the other terminal of each of the switches pass through a cable 204 which leads to the selector electromagnets. Each switch is connected to one of the twenty selector electromagnets. Although but a few of the electromagnets, such as electromagnets 191 and 192 are shown, it will be understood that all twenty are similarly connected.

In operation, card selection is made by closing one switch in each column. This energizes two of the electromagnets through the normally closed lower roller switch LRS–1.

The search process is started by depressing the search button S momentarily which closes switches S1–1 and S1–2. Closure of S1–1 energizes the rotary solenoid 167 which drives all of the selector bars to their active positions. The two energized selector electromagnets latch two of the selector bars in the active position. Release of the button S opens switch S1–1, de-energizing the rotary solenoid 167 thereby returning the eighteen unselected bars to their inactive positions.

Closure of the switch S1–2 energizes the relay K1 through the closed lower roller switch LRS–2. The relay K1 is provided with four sets of normally open contacts K1–1, K1–2, K1–3 and K1–4 which are closed when the relay is energized. Closure of contacts K1–1 maintains the relay K1 energized when the button S is released. Closure of contacts K1–2 causes current to flow from the variable D.C. supply 205, through the closed lower roller switch LRS–3 to the motor 58 (M2) and back to the supply 205, thereby causing the file of cards to be moved back and forth. Closure of contacts K1–3 energizes the electromagnet 62 through the closed lower roller switch LRS–4, thereby retracting the vane 156 (FIGURE 15) in the valve and nozzle assembly and allowing air to flow. Retraction of the vane 156 releases the actuator of the switch OS–1 (FIGURE 15 and the top of FIGURE 23) thereby providing an auxiliary path for the energization of the selector electromagnets. Closure of contacts K1–4 connects 117 v. A.C. to a motor M1 which is mechanically connected to a blower 206 thereby providing a source of air under pressure. The motor and fan of a household vacuum cleaner have been found to provide a suitable air flow. It will be understood that the exhaust of blower 206 is connected to the pipe 63 (FIGURE 7) and thence to the orifice and valve assembly 61.

It will be noted that the motor 161 (M3) is energized, as shown, as power is turned on, through the closed limit position switch LPS–3 and the upper contacts of the switches RS–1 and RS–2.

At this stage of the operation, the rollers are turning, air is flowing, and the file is being scanned back and forth between the orifice and the rollers. The selected card passes over the orifice and is normally raised at this time. If for some reason the card is not raised, scanning continues. Although the file 51 may reach its reference position, actuation of the reference position switch RPS–1 has no effect at this time since the limit position switch LPS–1 is open. Accordingly, the motor 58 continues to rotate and the file 51 is scanned back and forth until the selected card is raised. When it is raised, it enters the lower rollers thereby actuating the lower roller switches LRS–1, LRS–2, LRS–3 and LRS–4. Actuation of the switch LRS–1 to its lower position opens one of the energizing paths for the selector electromagnets but they remain energized at this time through the previously mentioned auxiliary path through the switch OS–1. Actuation of the switch LRS–2 de-energizes the relay K1 causing contacts K1–1, K1–2, K1–3 and K1–4 to open. Actuation of the switch LRS–3 de-energizes the motor 158 and short circuits its armature thereby applying dynamic braking and quickly stopping the movement of the card file. Actuation of the switch LRS–4 de-energizes the electromagnet 62 whereupon the spring 154 (FIGURE 14) urges the vane 156 (FIGURE 15) across the orifice, cutting off the flow of air and actuating the switch OS–1. The switch OS–1 then reverts to the position shown in FIGURE 23 thereby de-energizing the selector electromagnets and retracting the selector bars. It is noted that the use of the switch OS–1 prevents the selector bars from being retracted to their inactive positions until the flow of air is cut off. Opening of the contacts K1–1 prevents energization of the relay K1 until button S is again depressed; opening of contacts K1–2 further opens the energizing circuit to the motor 58; opening of the contacts K1–3 further opens the energizing circuit to the electromagnet 62; and the opening of the contacts K1–4 de-energizes the blower motor M1.

As the card is drawn upward by the lower rollers, it engages the upper rollers thereby actuating the upper roller switch URS–1 which energizes the solenoids 202 and 203. These solenoids, it will be recalled, are mechanically interconnected with the twenty selector push buttons and their associated switches. Energization of the solenoids 202 and 203 raises any depressed buttons, opens the corresponding switches, and prevents latching down of any buttons as long as the solenoids remain energized.

The card continues to rise and leaves the lower rollers thereby actuating the switches LRS–1, LRS–2, LRS–3 and LRS–4 to their former positions, but such actuation has no further effect at this time. Although the switch LRS–1 be closed, none of the selector switches is closed and no selector electromagnets are energized. Closure of switch LRS–2 has no effect since the switch S1–2 and the contacts K1–1 are open. Actuation of the switch LRS–3 removes the dynamic braking from the motor 58, but the motor is already at rest and does not become energized since contacts K1–2 are open. Closure of the switch LRS–4 does not energize the electromagnet 62 because the contacts K1–3 are open.

The card rises further, drawn by the upper rollers, until it engages the bar 102 thereby actuating the limit position switches LPS–1, LPS–2, and LPS–3. Actuation of the switch LPS–1 energizes the scan motor 58 through the reference position switch RPS–1 thereby moving the file 51 toward its reference position. Actuation of the switch LPS–2 partially establishes a second dynamic braking circuit for the motor 58. When the file reaches its reference position with the inclined edge 158 beneath the drive rollers (see FIGURE 16), the switch RPS–1 is actuated thereby removing the energization from the motor and establishing a dynamic braking circuit, thus stopping the file 51 quickly. Actuation of the switch LPS–3 de-energizes the drive roll motor 161.

At this stage the card is on the platen 65 in viewing position. When it is desired to return the card to the file, the return button R is depressed and held down until the card is in the file. The button R actuates the switches RS–1 and RS–2 simultaneously thereby applying 28 volts D.C. to the drive roll motor 161 independently of the switch LPS–3 and with a polarity opposite to that previously applied. The motor 161 (M3) is of the kind in which the direction of rotation is determined by the polarity of the direct current applied thereto such as a direct current motor with a permanent magnet field and an energized armature. The direction of rotation of the drive rollers is thus reversed, driving the card downward.

As the card leaves the bar 102, the switches LPS–1, LPS–2 and LPS–3 revert to their former positions. The return of the switch LPS–3 to its former position partially reestablishes the normal energization circuit of the motor 161 but it is apparent from the drawing that the return of the switches LPS–1 and LPS–2 has no further effect at this time. Likewise, the momentary operation of the switches LRS–1, LRS–2, LRS–3 and LRS–4 as the card enters and leaves the lower drive rollers has no further effect. However, when the card leaves the upper drive rollers, the switch URS–1 reverts to the position shown in FIGURE 23, thereby de-energizing the solenoids 202 and 203, thus reenabling the latching mechanism associated with the selector push buttons on the panel 201. When the card is back in the file, the button R is released, thereby returning the switches RS–1 and RS–2 to the position shown, thus re-energizing the motor 161 in the forward direction. The apparatus is now in condition to enable a new card selection to be made.

It is apparent from the above description that applicant has provided a novel apparatus for quickly selecting any desired card in a file of cards. In some applications it may be sufficient to employ only the apparatus which selects and raises the desired card after which it may be abstracted manually. In other applications it may be preferred to provide also the apparatus for automatically abstracting the card and placing it in viewing position.

An important feature of the invention is the discovery that a moving stream of air is very effective in ejecting a card from a pack. Use of this feature eliminates the mechanical wear on the edges of cards inherent in some prior systems in which rods or needles are passed through holes and actually lift the cards or in which moveable bars raise the selected card by bearing against the bottom edge. Another advantage is that the stream of air envelopes the selected card as it is ejected thereby minimizing abrasion of the faces of both the selected card and cards adjacent thereto. This is particularly important in the case of microfilm aperture cards where such abrasion would cause the film to be scratched.

Another important feature, contributing to the simplicity and reliability of the embodiment including the automatic abstraction of a card, is the alignment of the rollers constituting the card abstractor with the stream of air, thereby defining a plane of action. This construction permits the selector bars to have a short throw, since in the active position they need extend only through the plane of action and need be withdrawn but a short distance to allow a card to be withdrawn. It would be possible to hold the cards stationary and move the selector bars, the rollers and the air stream but the arrangement shown, in which the cards are moved successively through a stationary plane of action, is preferred at present.

Another feature, one that contributes to the speed of operation, is that once a card is selected, its upward movement to the viewing position is continuous rather than intermittent. The drive rollers are turning before the air stream selects the card. When the card is raised by the air stream, the portions of the upper edge of the card on each side, which are free of notches, are engaged by the rollers which continue the upward movement. At this time the bottoms of the notches are approaching the selector bars but the bars are retracted while the card is moving and are out of the way before the bottoms of the notches can reach the bars.

Although preferred arrangements have been described in considerable detail for illustrative purposes, many modifications will occur to those skilled in the art. It is therefore desired that the protection afforded by Letters Patent be limited only by the true scope of the appended claims.

What is claimed is:
1. Card selecting apparatus, comprising,
   a plurality of cards each having classifying notches along one edge thereof,
   a container having a first, open, end and a second end opposite said first end partially open, said cards being stored in said container with the notched edges adjacent said open end,
   means including a nozzle for forming a moving air stream having an elongated cross section,
   a plurality of elongated selector bars each moveable longitudinally to either an active or an inactive position, said bars when in said active position intersecting the plane of the elongated cross section of said air stream at a substantial distance from said nozzle,
   a plurality of spring means each for urging one of said bars toward said inactive position,
   a plurality of latching means each for holding one of said bars in said active position,
   means for selectively engaging and disengaging each of said latching means,
   activating means for moving all of said bars from said inactive to said active position, whereby any engaged latching means holds its associated bar in said active positive upon release of said activating means,
   and means for moving said container between said nozzle and said selector bars with said first end adjacent to said bars and said second end adjacent to said nozzle, whereby said air stream acts successively on said cards and successively urges each toward said bars and whereby those bars in said active position prevent substantial movement of cards lacking notches in registry with said active bars while en- abling any card having notches in registry to be moved substantially by said air stream.

2. The method of selecting a card having a predetermined notch configuration from a pack of cards which are facially juxtaposed but have differing notch configurations, said method comprising the steps of:
(a) resting the cards in pack alignment upon one or more support surfaces which are common to one or more edges of the cards,
(b) positioning relative to said pack abutment means in a predetermined code configuration, whereby said abutment means engages and restrains all cards of the pack except the card bearing the predetermined notch configuration, and,
(c) while said cards are resting upon said surface, impinging a velocity stream of gaseous fluid serially against the edges of said cards common to one edge of the pack through an aperture at one of said support surfaces,
(d) said gaseous stream being of sufficient velocity to penetrate said pack to separate said cards and also of sufficient velocity to cause that card bearing the predetermined notch configuration to move relative to the pack in a direction parallel to the flow of said gaseous stream.

3. The method of selecting a card having a predetermined code notch configuration from a plurality of differentially code notched cards of similar size, which method comprises:
arranging the cards in facial juxtaposition and edgewise alignment in the form of a pack presenting a delivery edge and other edges contiguous and opposite thereto,
positioning relative to the notches of the cards of said pack abutment means in predetermined code configuration effective to restrain all cards of the pack except the card bearing the predetermined code notch configuration, and
impinging a velocity stream of gaseous fluid serially upon the edges of the cards common to an edge of the pack which is opposite said delivery edge and which stream is moving in a direction toward said delivery edge while supporting the cards upon a rest engaging one of said other edges, which rest is effective independently of said abutment means to prevent cards of the pack from falling from said pack under the effects of gravity, said gaseous stream being of sufficient velocity to penetrate said pack and also being of sufficient velocity to cause that card bearing the predetermined notch configuration to be shifted relative to the cards restrained by said abutment means to a position at least partially beyond said delivery edge of said pack by movement relative to said support against all of the effects of the force of gravity acting on said card.

4. The method of claim 3 wherein the said delivery edge is horizontally disposed.

5. The method of claim 3 wherein the said delivery edge is vertically disposed.

6. The method of selecting a card having a predetermined code notch configuration from a plurality of differentially code notched cards of similar size, which method comprises:
arranging the cards in facial juxtaposition and edgewise alignment in the form of a pack presenting a delivery edge and other edges contiguous and opposite thereto,
positioning relative to the notches of the cards of said pack abutment means in predetermined code configuration effective to restrain all cards of the pack except the card bearing the predetermined code notch configuration,
impinging a velocity stream of gaseous fluid serially upon the edges of the cards common to an edge of the pack which is opposite said delivery edge and which stream is moving in a direction toward said delivery edge while supporting the cards upon a rest engaging one of said other edges, which rest is effective independently of said abutment means to prevent cards of the pack from falling from said pack under the effects of gravity, and
biasing said cards toward facial engagement with each other,
said gaseous stream being of sufficient velocity to penetrate said pack and also being of sufficient velocity to cause that card bearing the predetermined notch configuration to be shifted relative to the cards restrained by said abutment means to a position at least partially beyond said delivery edge of said pack by movement relative to said support against all of the effects of the forces of gravity and bias acting on said card.

7. The method of selecting a card having a predetermined code notch configuration from a plurality of differentially code notched cards of similar size, which method comprises:
arranging the cards in facial juxtaposition and edgewise alignment in the form of a pack presenting a delivery edge and other edges contiguous and opposite thereto,
positioning relative to the notches of the cards of said pack abutment means in predetermined code configuration effective to restrain all cards of the pack except the card bearing the predetermined code notch configuration, and
impinging a velocity stream of gaseous fluid serially upon the edges of the cards common to an edge of the pack which is opposite said delivery edge and which stream is moving in a direction toward said delivery edge while supporting the cards upon a rest engaging one of said other edges, which rest is effective independently of said abutment means to prevent cards of the pack from falling from said pack under the effects of gravity, said gaseous stream being of sufficient velocity to penetrate said pack and also being of sufficient velocity to cause that card bearing the predetermined notch configuration to be shifted relative to the cards restrained by said abutment means to a position at least partially beyond said delivery edge of said pack by movement relative to said support against all of the effects of the force of gravity acting on said card,
thereafter withdrawing restraint from all cards while said pack continues to rest on the support, and
extracting the predetermined card from the pack, 8. The method of selecting a card having a predetermined notch configuration from a pack of cards which are facially juxtaposed but have differing notch configurations, said method comprising the steps of:
(a) resting said cards under their own weight, in pack alignment, upon a support surface whereby to prevent any unrestrained card from falling from the pack,
(b) positioning relative to said pack abutment means in a predetermined code configuration, whereby said abutment means engages and further restrains against substantial movement all cards of the pack except the card bearing the predetermined notch configuration, and
(c) while supporting said cards upon said support surface, impinging a velocity stream of gaseous fluid serially against the edges of said cards common to an edge of the pack other than the edge opposite that on which the cards are resting, for imposing upon said cards a force urging all of the same to move relative to said support surface,
(d) said gaseous stream being of sufficient velocity to penetrate said pack and also being of sufficient velocity to cause that card bearing the predetermined notch configuration to be displaced relative to the remainder of the pack in a direction parallel to the flow of the said gaseous stream against all of the effects of the force of gravity acting thereon.

9. The method of selecting a card having a predetermined notch configuration from a pack of cards which are facially juxtaposed but have differing notch configurations, said method comprising the steps of:
(a) resting said cards under their own weight in pack alignment upon a support surface with a bottom edge of the pack engaged with said support surface, said aligned pack having a second edge contiguous with said bottom edge of the pack and normal to said support surface, one of said edges of said pack being exposed so as to be presentable to an impinging air stream and another edge of said pack opposite said exposed edge being exposed and open to the escape of air,
(b) positioning abutment means relative to said pack in a predetermined code configuration, whereby said abutment means engages and restrains all cards of the pack except the card bearing the predetermined notch configuration, and
(c) while said cards are resting upon said support surface, impinging a velocity stream of gaseous fluid serially against said exposed air stream presentable edge of the pack,
(d) said gaseous stream being of sufficient velocity to penetrate said pack to separate said cards and also being of sufficient velocity to cause that card bearing the predetermined notch configuration to move to a physically discrete position against all of the effects of the forces of gravity acting thereon.

10. The method of selecting a card having a predetermined notch configuration from similar cards having differing notch configurations, which method comprises the steps of:
(a) arranging the cards in a pack whereby aligned edges thereof define contiguous planar surfaces,
(b) resting the cards under their own weight upon a support at one of said planar surfaces whereby to prevent any otherwise unrestrained card from falling from the pack,
(c) applying abutment means to the pack in a predetermined code configuration to further restrain all cards of the pack except the card bearing the predetermined notch configuration, and
(d) while said cards are resting upon said surface, impinging an upwardly directed velocity stream of gaseous fluid serially through said support and against the bottom edges of the cards, for imposing upon said cards a force urging them to move relative to said support surface, said gaseous stream being of sufficient velocity to penetrate said pack and separate said cards facially one from another, and also being of sufficient velocity to cause that card bearing the predetermined notch configuration to be physically displaced upwardly from the remainder of the pack against all of the effects of the force of gravity acting thereon.

11. The method of selecting a card having a predetermined notch configuration from similar cards having differing notch configurations, which method comprises the steps of:
(a) arranging the cards in a pack whereby aligned edges thereof define contiguous planar surfaces,
(b) biasing said cards of said pack into compressive facial engagement,
(c) resting the cards under their own weight upon a support at one of said planar surfaces whereby to prevent any otherwise unrestrained card from falling from the pack,
(d) applying abutment means to the pack in a predetermined code configuration to further restrain all cards of the pack except the card bearing the predetermined notch configuration, and
(e) while said cards are resting upon said surface and are in compressive facial engagement, impinging a velocity stream of gaseous fluid serially against the edges of the cards which define one of the said planar surfaces other than that opposite the edges upon which said cards are resting, for imposing upon said cards a force urging them to move relative to said support surface, said gaseous stream being of sufficient velocity to penetrate said pack and separate said cards facially one from another by overcoming said compressive facial bias, and also being of sufficient velocity to cause that card bearing the predetermined notch configuration to be physically displaced from the remainder of the pack against all of the effects of the force of gravity acting thereon.

12. The method of selecting a card having a predetermined notch configuration from similar cards having differing notch configurations, which method comprises the steps of:
(a) arranging the cards in a pack whereby aligned edges thereof define contiguous planar surfaces,
(b) biasing said cards of said pack into compressive facial engagement,
(c) resting the cards under their own weight upon a support at one of said planar surfaces whereby to prevent any otherwise unrestrained card from falling from the pack,
(d) applying abutment means to the pack in a predetermined code configuration to further restrain all cards of the pack except the card bearing the predetermined notch configuration,
(e) while said cards are resting upon said surface, and are biased toward compressive facial engagement, impinging a velocity stream of gaseous fluid serially against the edges of the cards which define one of the said planar surfaces other than that opposite the edges upon which said cards are resting, for imposing upon said cards a force urging them to move relative to said support surface, said gaseous stream being of sufficient velocity to penetrate said pack and separate said cards facially one from another by overcoming said compressive facial bias, and also being of sufficient velocity to cause that card bearing the predetermined notch configuration to be partially removed from the remainder of the pack against all of the effects of the force of gravity acting thereon, and
(f) holding said partially removed card in said partially removed position by the biased facial engagement of adjacent cards.

13. Card selecting apparatus for separating a card bearing a preselected notched coding from a pack of cards having different notch codings, said apparatus comprising:
a pack of cards,
a container having a bottom card supporting wall structure normally fixed relative to said container, and a second side wall structure contiguous to said bottom structure, one of said wall structures having an aperture coextensive with a portion of an edge of each of the cards common to an edge of the pack stored within said container, said container having an open end on a side opposite the said wall having said aperture, said container being effective to store said cards in a position in which all of the cards are resting under their own weight upon said bottom wall structure in edgewise pack alignment,
a plurality of members selectively actuatable to positions of operability in which said members restrain all cards not having notches registered with each of the said members, and
means for ejecting cards having notches in registry with said selected members, said ejecting means comprising means for sequentially passing a gaseous stream of fluid through said aperture and through said pack to expand said pack by causing cards adjacent said gaseous stream to move in a direction normal to the direction of flow of said stream, and also being effective to move against all effects of gravity any unrestrained card entrained in said stream relative to said pack and bottom structure.

14. The apparatus of claim 13 wherein said means for sequentially passing a gaseous stream of fluid through said pack includes means for moving said container back and forth through said air stream whereby said cards are subjected successively and repeatedly to the action of the air stream, and means responsive to ejection of any unrestrained card for halting the movement of said container.

15. The apparatus of claim 13 wherein said means for sequentially passing a gaseous stream of fluid through said pack includes a nozzle having a relatively long, narrow orifice, said lengthwise dimension of said nozzle being in edgewise alignment with an edge of said cards common to one edge of said pack.

16. The apparatus of claim 15 further including a valve for controlling the flow of said gaseous fluid through said nozzle, and means responsive to the movement of any unrestrained card relative to said pack for closing said valve to shut off said flow of gaseous fluid through said nozzle.

17. The apparatus of claim 15 further including a transport mechanism aligned with said orifice and said gaseous stream for engaging any unrestrained card moved by said gaseous stream and for continuing the movement of said card completely out of said pack.

18. The apparatus of claim 17 wherein said transport mechanism includes a pair of motor driven oppositely rotating cylindrical rollers mounted on parallel axes and spring biased to cause the surfaces thereof to engage each other for advancing any card thrust into the intersection of said surfaces, said rollers being positioned with the line of engagement of said surfaces and the longitudinal center line of said air stream lying in the same plane.

19. The apparatus of claim 15 wherein said selectively actuatable members comprise a plurality of elongated selector bars and means for moving said bars longitudinally from an inactive to an active position, said active position being with the ends of the bars intersecting the path of flow of said gaseous stream.

20. Card selecting apparatus for separating a card bearing a preselected notched coding from a pack of cards having different notch codings, said apparatus comprising:

a container having a first bottom card supporting wall structure normally fixed relative to said container, an aperture in said bottom card supporting wall structure coextensive with a portion of an edge of each of the cards to be stored within said container, said container having an open wall on a side opposite said bottom wall, said container being effective to store said cards in a position in which all of the cards are resting under their own weight upon said bottom wall structure in edgewise pack alignment, a plurality of members selectively actuatable to positions of operability in which said members restrain all cards not having notches in registry with each of the said members, and means for ejecting cards having notches in registry with said selected members, said ejecting means comprising means for sequentially passing a gaseous stream of fluid upwardly through said aperture and through said pack to expand said pack by causing cards adjacent said gaseous stream to move in a direction normal to the direction of flow of said stream, and also being effective to move against all effects of gravity any unrestrained card entrained in said stream upwardly relative to said pack and bottom structure.

21. Card selecting apparatus for separating a card bearing a preselected notched coding from a pack of cards having different notch codings, said apparatus comprising:

a container having a first bottom card supporting wall structure normally fixed relative to said container, and a second side wall structure contiguous to said bottom structure, one of said first and second wall structures having an aperture coextensive with a portion of an edge of each of the cards to be stored within said container, said container having an open wall on a side opposite said wall having said aperture, said container being effective to store said cards in a position in which all of the cards are resting under their own weight upon said bottom wall structure in edgewise pack alignment, a plurality of members selectively actuatable to positions of operability in which said members restrain all cards not having notches in registry with each of the said members, means for biasing said cards of said deck into compressive facial engagement, and means for moving cards having notches in registry with said selected members, said ejecting means comprising means for sequentially passing a gaseous stream of fluid through said aperture, and through said pack to force said pack open against said biasing means by causing cards adjacent said gaseous stream to move in a direction normal to the direction of flow of said stream, and also being effective to move any unrestrained card entrained in said stream relative to said pack and bottom structure.

22. The apparatus of claim 21 wherein said biasing means includes a spring acting between one wall of said container and the last card of said pack of cards.

23. Card selecting apparatus for separating a card bearing a preselected notched coding from a pack of cards having different notch codings, said apparatus comprising:

a container having a first bottom card supporting wall structure normally fixed relative to said container, and a second side wall structure contiguous to said bottom structure, one of said first and second wall structures having an aperture coextensive with a portion of one edge of each of the cards to be stored within said container, said container having an open wall on a side opposite said wall having said aperture, said container being effective to store said cards in a position in which all of the cards are resting under their own weight upon said bottom wall structure in edgewise pack alignment, a plurality of members selectively actuatable to positions of operability in which said members restrain all cards not having notches in registry with each of the said members, means for partially removing cards having notches in registry with said selected members from said pack, said means comprising means for sequentially passing a stream of fluid through said aperture, and through said pack to expand said pack by causing cards adjacent said gaseous stream to move in a direction normal to the direction of flow of said stream, and also being effective to partially remove any unrestrained card while entrained in said stream by moving it relative to said pack and bottom structure, and means engageable with said partially removed card for completely abstracting it from said pack.

24. The apparatus of claim 23 wherein said abstracting means includes opposed rollers between which said partially removed card is movable.

25. Card selecting apparatus for separating a card bearing a preselected notched coding from a pack of cards having different notch codings, said apparatus comprising:

a container having a first bottom card supporting wall structure normally fixed relative to said container, and a second side wall structure contiguous to said bottom structure, one of said first and second wall structures having an aperture coextensive with a portion of one edge of each of the cards to be stored within said container, said container having an open wall on a side opposite said wall having said aperture, said container being effective to store said cards in a position in which all of the cards are resting under their own weight upon said bottom wall structure in edgewise pack alignment, a plurality of members selectively actuatable to positions of operability in which said members restrain all cards not having notches in registry with each of the said members, means for partially removing cards having notches in registry with said selected members from said pack, said means comprising means for sequentially passing a stream of fluid through said aperture, and through said pack to expand said pack by causing cards adjacent said gaseous stream to move in a direction normal to the direction of flow of said stream, and also being effective to partially remove any unrestrained card while entrained in said stream by moving it relative to said pack and bottom structure, and means engageable with said partially removed card for completely abstracting it from said pack, and returning it to said pack.

26. The apparatus of claim 25 wherein said abstracting and returning means includes opposed rollers operable upon rotation in one direction to withdraw the partially removed card from the pack, and upon rotation in an opposite direction to return the card to said pack.

References Cited by the Examiner

UNITED STATES PATENTS

| | | | |
|---|---|---|---|
| 2,169,050 | 8/1939 | Johnston | 129—16.1 |
| 2,269,767 | 1/1942 | Jayne | 129—16.1 |
| 2,644,458 | 7/1953 | Meagher | 129—16.1 |
| 2,692,774 | 10/1954 | Sidman | 271—18 |
| 3,055,131 | 9/1962 | Novak | 40—36 |

EUGENE R. CAPOZIO, *Primary Examiner.*

EDWARD V. BENHAM, JEROME SCHNALL,
*Examiners.*